INVENTOR
Kendric R. French

INVENTOR
Kendric R. French
BY Milmore & Cypher
Attorneys

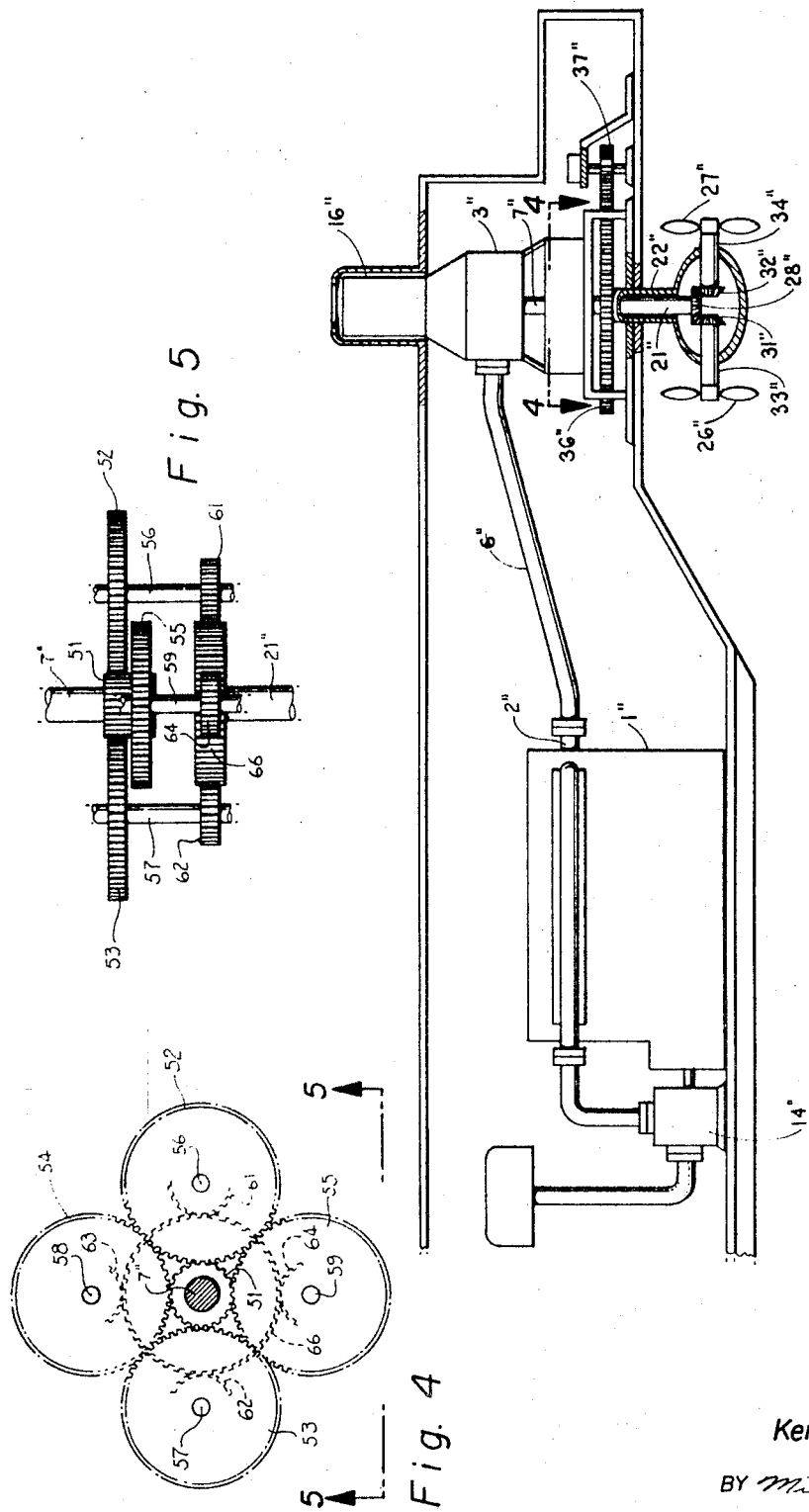

United States Patent Office 3,463,115
Patented Aug. 26, 1969

3,463,115
SHIP PROPULSION SYSTEM
Kendric R. French, 1632 Live Oak Way,
Walnut Creek, Calif. 94596
Filed Feb. 23, 1968, Ser. No. 707,669
Int. Cl. B63h 25/42
U.S. Cl. 115—35          1 Claim

ABSTRACT OF THE DISCLOSURE

This specification discloses a ship propulsion system which consists briefly of a four cycle diesel engine whose exhaust gases drive a gas turbine which in turn are connected to a gear reduction means which transmits the power to propeller means. A preferred propeller means consists of coaxially mounted counterrotating dual propellers with the assembly mounted on a vertical shaft extending from the ship into the water. Further modified forms include multiple engines and turbines and dual propeller means.

BACKGROUND OF THE INVENTION

This invention pertains to ship propulsion systems and in particular to a new combination of power unit consisting of a standard four cycle diesel engine and a gas turbine. This power unit is adaptable for driving counterrotating dual propellers mounted on a vertical shaft which can be rotated so that the ship needs no rudder, or reversing gear means.

Gas turbines normally use a combustor to create gas under pressure but there are other means. Stott, Patent 2,647,363 used a specially built piston engine to produce the gas under pressure and Lawson, 938,253 was an attempt to harness some of the energy from an internal combustion engine. None of these solutions recognized the efficiency of the four cycle diesel engine for producing gas under pressure only, which is manufactured in quantity and is readily serviced at numerous installations along waterways and harbors.

In regard to the propelling mechanism, Stechauner, 1,813,552 mounted dual, oppositely pitched propellers on a small outboard motor having a vertical shaft with the propellers on the same side. Having the two propellers on the same side of the vertical shaft for large installations as in tug boats or ocean going vessels would pose a tremendous imbalance problem. A more recent example is Patent 2,987,031. Waterval, 2,691,356 shows counter-rotating oppositely mounted dual propellers but the vertical shaft does not rotate and a rudder as shown in FIG. 3 of the patent is required.

SUMMARY

This invention relates to a diesel-gas turbine, rudderless propulsion system primarily for the purpose of both propelling and steering river towboats which push rather than pull one or more self-propelled barges or scows through shallow inland waterways, although it may be readily adapted to new construction and conversion of other craft, large and small, commercial and military. The system is particularly designed for river towboats of large power, averaging about 140 feet in length, and having 5000 or more horsepower, which push big integrated tows of many barges over distances comparable to fairly long ocean voyages, and which require long continued, high efficiency, high endurance operation. The system makes possible the use of high efficiency, multiple unit, high speed, lightweight diesel engines, producing large aggregate power, with weight distribution throughout the hull, under conditions of quick maneuverability, heretofore not possible without the employment of massive pieces of machinery of high design cost. The system also makes possible the more convenient positioning of the units of machinery throughout the hull of the vessel. The system obviates the necessity of conventional arrangements of engines, shafting, high precision alignment, stern packing glands, mufflers, large hull openings, propellers, and rudders. The system also makes use of a much improved arrangement of dual propellers, arranged in twin units which makes for a very sensitive fast operating steering, reversing, and idling control.

By the proposed arrangement of four cycle high speed lightweight diesel engine blocks which act as feeder units for gas turbines which produce the rotative shaft power, gearing, minimal short shafting not requiring alignment, twin dual propeller units, an efficient, compact, and light marine power plant of economical first cost, long life, and readily available removeable components may be produced and easily installed in towboats and other craft, having substantial advantages in simplicity of control both as to power output and consequent speed, and quick turning and reversing of vessel and tow. The system has the added advantage of making it possible to replace worn or inoperative diesel units from riverport based service craft while underway with a tow, without any serious slackening of speed. It enables season long nonstop operation in the face of engine failure, without the risk and financial loss of downtime for engine repairs within the boat hull. Also, it is possible to avoid the cost of custom design, construction, and installation of specially built, non-replaceable large engines normally employed in the most powerful river towboats. There is the added advantage that with a multiple unit system of small light weight units, parts are more readily available and easily replaced. Wide-spread industrial diesel engine agencies form a ready source of parts.

Although most components of the system may be readily purchased in the machinery market on an over-the-counter basis, the design theory and sequential arrangement of the entire train of mechanism comprising the propulsion system is a novel one, and there are several individual features of the system which make it differ from any propulsion system for river towboats now in existence. Four basic advantages are effected: first that all machinery may be placed as convenient with no rigid requirements as to deck level and alignment, second, that the machinery should consist of lightweight components which may be removed and replaced easily with minimal interruption of operation, and third, that hot gas for the driving turbine be produced in a four cycle diesel engine, and fourth, that dual propellers, are capable of producing both more efficient propulsion and more accurate steering. Ocean going vessels using the system will be able to maneuver in and out of docks without the use of tugs, except where legally required.

BRIEF DESCRIPTION OF THE DRAWING

FIGURE 3 is a side elevation view of an alternate form of the invention with portions broken away for purposes of clarity.

FIGURE 4 is a top plan view of a portion of the system taken substantially along the line 4—4 of FIGURE 3.

FIGURE 5 is a side elevation view taken substantially along line 5—5 of FIGURE 4.

DESCRIPTION OF THE PREFERRED EMBODIMENTS

Figure 1:
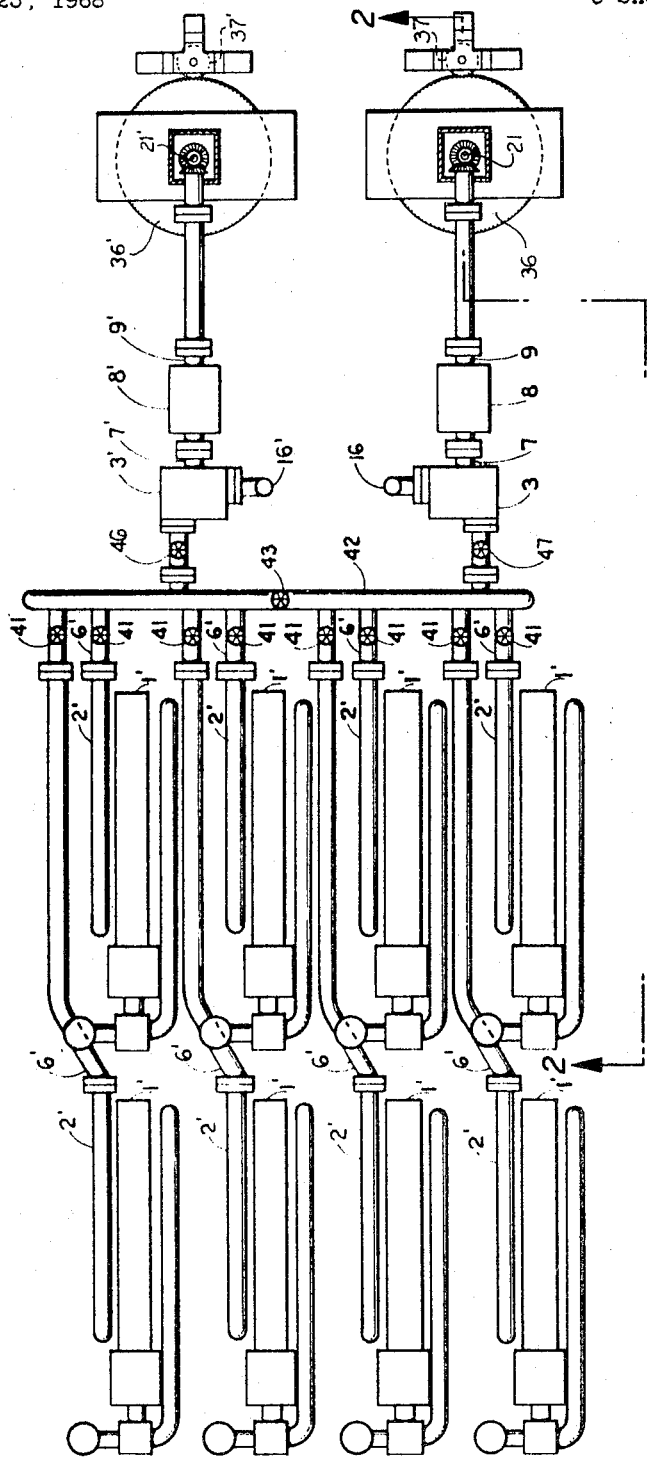
FIGURE 1 is a top plan view of an alternate form of the ship propulsion system described in the present invention.
Figure 2:
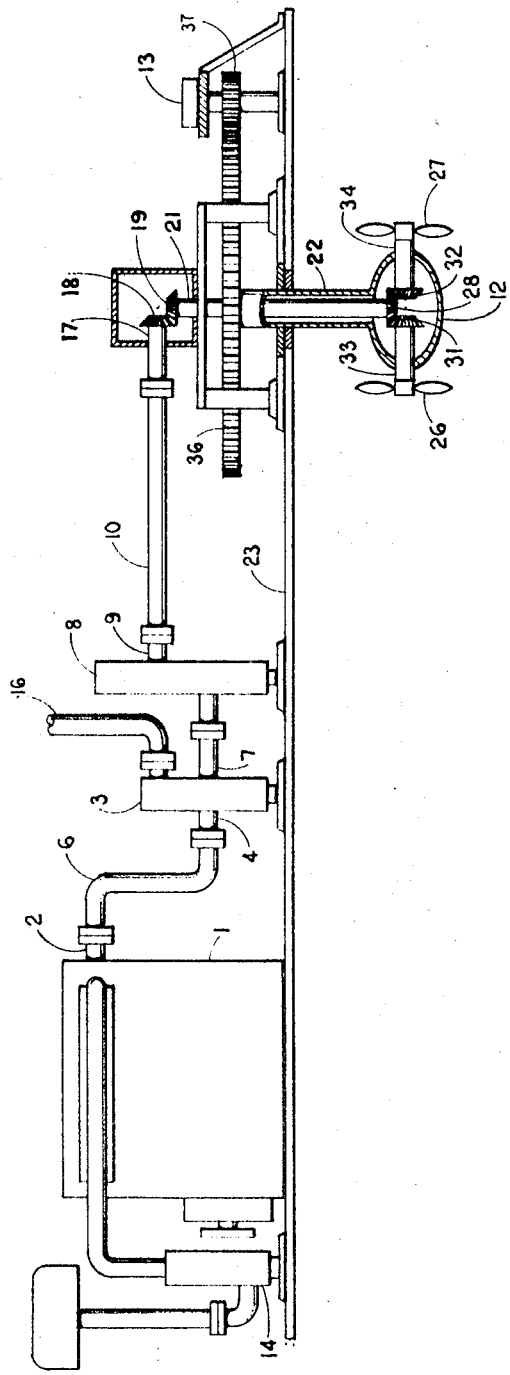
FIGURE 2 is a side elevation of the invention with portions removed for purposes of clarity taken substantially along the line 2—2 in FIGURE 1 but with the manifold and valves removed.

The ship propulsion system of the present invention consists briefly of a four cycle diesel engine 1 having an exhaust port 2 for venting the hot gases under pressure; a gas turbine 3 having an intake port 4 connected to exhaust line 6 of the engine and an output shaft 7; a gear reduction means 8 connected to the turbine output shaft and having a drive shaft 9 and 10; propeller means 12 mounted for 180° rotation and operatively connected to the drive shaft; and motor means 13 connected to the propeller means for effecting rotation of the propeller means thereby effecting steering of the ship.

The diesel engine is a vertical trunk piston, single acting diesel producing gas under pressure of about 100 to 250 p.s.i. Several companies produce full lines of such engines such as Allis-Chalmers, Caterpillar, Cummins, Fairbanks-Morse and International. Skid mounted blocks may be bolted to the deck wherever the engine units are to be placed. High endurance lightweight four cycle industrial engines of stock production ranging in horsepower rating from 500 to 1000 are suitable.

The sole function of the engines is to produce hot gases under pressure. The back pressure forms the working load and the exhaust stroke becomes a working stroke. With a turbo blower 14 providing intake air at about two atmospheres, working from the projecting driveshaft which is normally a part of a stock unit industrial diesel engine, the intake stroke to a slight degree also becomes a power stroke. Density of intake air can be increased through use of a water cooled intake manifold. Unlike most marine engines, in this system the exhaust manifold is insulated, not cooled, as it is desirable to keep the temperature of the gas under pressure as high as possible, which in no case is likely to exceed 900°, due to the cooling effect of the cylinder walls of the engine. This is a very manageable temperature for a gas turbine; conductive to a very long life for the gas turbine unit.

The efficiency of a full gas turbine unit seldom exceeds that of an Otto cycle engine or about 20% of the mechanical equivalent of heat. The combination diesel-gas turbine propulsion should obtain efficiency comparable to a diesel or about 35%. Higher efficiency approaching 40% of the mechanical equivalent of heat should be possible in refined applications of the system.

The hot gases under pressure from the engine are piped through insulated conduits to the gas turbine. The turbine may be of any of the standard types of low temperature gas turbines available on the market. The turbine may have rim or axial flow which are sometimes termed "exhaust turbines." These are very long lived machines needing a minimum of servicing and attention, as they are not subjected to the withering heat and erosion effect of a high pressure, high temperature gas turbine, such as is used in a jet airplane. The turbine of the present invention is much less costly as special high temperature metal alloys are not required. Turbine speed may vary from 1000 to 10,000 r.p.m. Exhaust is through a short stack 16 near the stern of the vessel. No muffler is required as the speed and temperature of the exhaust gases have been considerably reduced.

The rotary mechanical power of the gas turbine is reduced in speed through helical reduction gears of standard design, thence through a short coupler shaft 17, and bevel gears 18 and 19 to the vertical drive shaft 21. No reversing turbine, mechanical or hydraulic reversing gears are used in this system which employs rudderless propulsion. A tubular steering shaft 22 attached to the tiller wheel, and enclosing a vertical driven shaft project through the deck 23 to the propeller pod which is immersed in the after run of the water below the stern of the ship. A pair of counter-rotating propellers 26 and 27 are coaxially mounted on opposite sides of the propeller pod. The driven shaft has a driven gear 19 adapted for engaging the driving gear 18. The gear means operatively connecting the driven shaft and the propellers is known as the Ramelli gear and consists of a bevel gear 28 which turns angularly mounted bevel gears 31 and 32 which turn shafts 33 and 34 connected to the propellers. The forward propeller pulls and the rear propeller pushes. The advantages of this arrangement are that much smaller propellers may be used, there is less vibration and there is an instantaneous steering effect. This is largely due to the fact that the sideways pressure of the propeller blades is balanced. Efficiency is not significantly different from the use of two single propellers, and steering is much easier. Since the use of dual propellers permits the use of a smaller propeller, the propellers do not project as far downwardly as a single large propeller, thus permitting a shallower draft. Further, an unexpected benefit is less loss due to cavitation, as the top of the smaller blade may be placed further beneath the surface of the water.

Steering is accomplished by a power driven tiller wheel of four to six feet diameter, which is capable of turning the steering shaft through a full 360° continuous circle, without stops, or the necessity of returning to the starting point. The tiller assembly is surrounded by a removable ring gear 36. The Patterson ring gear used for industrial rotating kilns and mixers would be suitable for this purpose. The tiller wheel assembly is turned by an adjoining pinion 37, and may be quickly or slowly moved in either direction by an electric, hydraulic, or air motor, by a similar arrangement to the conventional quadrant steering system.

The single turbine, single propeller pod thus far described could be used to replace the present steam plant on a World War II Liberty ship, of which there are nearly 1000 still around the various ghost fleets. A drive unit could be placed in about the same position as the present rudder and steering mechanism, and the feeder units could be placed under a shelter deck on both sides of the after hatchway. This could free all the present boiler room, engine room, and shaft alley for cargo space.

Military craft, such as LST large landing barges, could be deliberately designed with the twin propeller units and engine and turbine units within the double hull, on both sides of the cargo space. The system would also lend itself well for the propulsion of high endurance antisubmarine convoy escorts, improvements of the World War II, DE class. It is in river towboats, however, that the twin drive unit is most effective with its added turbine 3', shaft 7', gear reducer 8', drive shaft 9', vertical driven shaft 21', ring gear 36', and spur gear 37'. For added power and flexibility a plurality of diesel units 1' are connected by their respective exhaust pipes 2' through valves 41 to a common manifold 42 having switch valve 43 and outlet valves 46 and 47. With this system, one or more diesels may be cut out of the system for adjustment or repair. When changing speed or manuevering the two mains should be kept separated.

With twin drive units, lever steering with two levers should be used. Lever steering has long been standard with river towboats. Present controls could be readily adapted to the proposed system. When normally underway, the levers are moved parallel through a connecting bar, as is presently done. The levers are capable of separate operation while manuevering or reversing, and the steering mechanism should be so devised, that the handle of each lever should indicate the steering position of the drive units. The steering motors should be of sufficient speed and power to effect a 180° turn in one second, but at no time to override the position set by the control lever. With the balancing effect of the dual propellers, turns should be far easier than with rudders.

In reversing, especially for a quick stop while underway with a tow, without slackening the speed of the turbines, the propeller pods are quickly toed in, until both have made a simultaneous 180° turn. For this purpose, the port propeller pod is turned clockwise, and the starboard propeller pod counterclockwise. The propeller pods turn to the same extent as the steering levers in the pilot house.

With this system, the thrust of the propellers is brought from full speed ahead to full speed astern in about one second. There is no slowing, stopping, starting, and accelerating of the engines, which remain at constant full speed throughout the manuever. In addition, the towboat and tow may be hove to, without slackening the speed of the turbines or feeder engines. From the ahead position, this is accomplished by turning the port tiller clockwise, or left rudder for 90°, and the starboard tiller right rudder or counterclockwise for 90°. In this manner, the towboat and tow could be eased to a stop while pushing upstream against the current, as in approaching a narrow bridge, to quickly resume speed when the emergency has passed.

By toeing in gradually from the ahead position, the towboat and tow may be slowed without slowing the engines. By toeing out from the full speed astern position, a slow holding effect may be produced, as holding against the current in moving downstream in approaching an upstream tow.

Changes in speed while under way may be made by successively cutting in or cutting out the feeder units, or by simultaneously revving them up, or slowing them down. By means of quick operating by-pass valves, the port feeder units could be connected with or separated from the starboard feeder units, as in slow speed maneuvering. Pilot house controls should be so arranged that throttles and by pass valves are under control of the pilot. Suitable mechanical controls, servo mechanisms, pneumatic and hydraulic controls from the pilot house are long established standard practice.

Another possible arrangement of this invention as adapted to ferryboats and river passenger boats, would be to place the propeller pods on side sponsons, in much the fashion of the paddle wheels of a side wheel steamer. This arrangement would furnish a large clear deck space, especially where motor vehicles, or container cargo, or piggyback trailers are carried. Such as arrangement would make the fast combined passenger and express cargo scheduled river packet boat again a profitable economic possibility. Also, with "side wheel" drive units, there are manuevering advantages of being able to hold constant position in breasting the current, and avoiding fouling or propeller drag in shallow water along the bank, levee, or close to a ferry slip apron. With an excursion vessel, it would be possible to have an ample clear area on the main deck for recreational use of the passengers.

It is proposed the engines be made in several standard horsepower sizes, and standard stock sizes of propellers be used. The engines could be easily removed by disconnecting the short coupler shaft between the engine and turbine. The entire engine could then be pulled out and taken ashore for repairs and overhaul, and a new unit installed in short order.

An alternative arrangement of the propulsion system is shown in FIGURES 4 and 5. In this arrangement, the gas turbine output shaft 7' is mounted coaxially with the vertical driven shaft 21" and includes a gear 51 at its distal end, a gear reduction means including four double reduction gears 52, 53, 54 and 55, engaging the output shaft gear 51 at two levels and oriented at 90° angles with four countershafts 56, 57, 58 and 59 connecting the smaller with the larger of the reduction gears. The smaller gears 61, 62, 63 and 64 engage gear 66 mounted on the vertical driven shaft 21".

Except for the foregoing differences, the propulsion system is the same as described in the previous figures, and consists of an engine 1", and exhaust line 2" and 6" connecting the engine and the turbine 3" with the exhaust gases vented through stack 16". The propeller pod 12", propellers 26" and 27" within housing 22" are also identical. There is no change in steering with ring gear 36" being turned by spur gear 37". An engine supercharger is designated by the number 14". The propellers are turned by a bevel gear 28", which turns gears 31" and 32" on shafts 33" and 34".

I claim:
1. A ship propulsion system comprising:
 (a) a four cycle diesel engine having an exhaust port for venting the hot gases under pressure;
 (b) a gas turbine having an intake port connected to the exhaust port of said engine and a vertically mounted output shaft having a gear at its distal end;
 (c) gear reduction means including four double reduction gears with the large gears engaging said output shaft gear at two levels and oriented at 90 degree angles with four countershafts connecting the smaller with the larger of said reduction gears;
 (d) propeller means mounted for at least 180 degree rotation and including a substantially vertical elongated housing extending from said ship into the water, a pair of counterrotating propellers coaxially mounted on opposite sides of the distal end of said housing, a substantially vertical driven shaft mounted coaxially with said turbine output shaft extending through said housing and having a gear on its proximal end connected to the smaller of said double reduction gears;
 (e) gear means engaging the distal end of said vertical driven shaft and said propellers for driving said ship; and
 (f) motor means connected to said propeller means for effecting rotation of said propeller means thereby effecting steering of said ship.

References Cited
UNITED STATES PATENTS

| | | | |
|---|---|---|---|
| 2,322,522 | 6/1943 | Johansson | 115—34 |
| 3,094,967 | 6/1963 | Willis | 115—35 |

TRYGVE M. BLIX, Primary Examiner

U.S. Cl. X.R.

60—13